(12) United States Patent
Mansour et al.

(10) Patent No.: US 10,242,114 B2
(45) Date of Patent: Mar. 26, 2019

(54) POINT OF INTEREST TAGGING FROM SOCIAL FEEDS

(71) Applicant: Microsoft Technology Licensing, LLC, Redmond, WA (US)

(72) Inventors: Riham Hassan Abdel-Moneim Mansour, Cairo (EG); Joseph W. Pepper, Kirkland, WA (US); Nesma Abd El-Hakim Refaei, Giza (EG); Diaa Mohamed Abdel Moneim Abdallah, Giza (EG); Vanessa Graham Murdock, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 14/144,213

(22) Filed: Dec. 30, 2013

(65) Prior Publication Data

US 2015/0186530 A1 Jul. 2, 2015

(51) Int. Cl.
*G06F 17/30* (2006.01)
(52) U.S. Cl.
CPC .............................. *G06F 17/3087* (2013.01)
(58) Field of Classification Search
CPC ............. G06F 17/30864; G06F 17/30867
See application file for complete search history.

(56) References Cited

U.S. PATENT DOCUMENTS

| 8,073,461 B2 | 12/2011 | Altman et al. |
| 2007/0214097 A1* | 9/2007 | Parsons ............. G06F 17/30864 |
| | | 706/12 |
| 2009/0111487 A1 | 4/2009 | Scheibe |
| 2010/0125604 A1 | 5/2010 | Martinez et al. |
| 2010/0280904 A1 | 11/2010 | Ahuja |
| 2010/0306211 A1 | 12/2010 | Chaudhuri et al. |
| 2011/0066588 A1* | 3/2011 | Xie .......................... G06N 5/02 |
| | | 706/58 |
| 2011/0072025 A1 | 3/2011 | Van et al. |

(Continued)

FOREIGN PATENT DOCUMENTS

| CN | 102047249 A | 5/2011 |
| CN | 102142003 A | 8/2011 |

(Continued)

OTHER PUBLICATIONS

"Second Written Opinion Issued in PCT Application No. PCT/US2014/068684", dated Sep. 2, 2015, 4 Pages.

(Continued)

*Primary Examiner* — Loc Tran
(74) *Attorney, Agent, or Firm* — Schwegman Lundberg & Woessner, P.A.

(57) ABSTRACT

A method is provided of enriching an entry for an entity in a local index of a search engine with tags. The method comprises obtaining location-related social media messages from within a neighborhood of an entity; determining from the obtained messages one or more terms that are unique to the entity; individually determining one or more co-occurring terms for the one or more unique terms; and using the one or more co-occurring term as tags to label the entity in the local index. Furthermore, a method is provided of retrieving social media messages associated with search results.

19 Claims, 6 Drawing Sheets

Entry of POI in local index

| Name | Pizza Hut |
|---|---|
| Street | 2743 E Madison St |
| City | Seattle |
| Postcode | |
| State | |
| URL | |
| Geolocation | 47°36'35"N 122°19'59"W |
| Description | Pizza, Food |

(56) References Cited

U.S. PATENT DOCUMENTS

| | | | |
|---|---|---|---|
| 2011/0077850 A1* | 3/2011 | Ushida | G01C 21/3664 |
| | | | 701/532 |
| 2011/0093515 A1 | 4/2011 | Albanese | |
| 2011/0113100 A1 | 5/2011 | Chawla | |
| 2011/0191310 A1* | 8/2011 | Liao | G06F 17/30616 |
| | | | 707/706 |
| 2013/0073686 A1 | 3/2013 | Sandholm | |
| 2013/0103697 A1 | 4/2013 | Hill et al. | |
| 2013/0110802 A1* | 5/2013 | Shenoy | G06F 17/30876 |
| | | | 707/706 |
| 2013/0124437 A1* | 5/2013 | Pennacchiotti | G06Q 50/01 |
| | | | 706/12 |
| 2013/0297581 A1 | 11/2013 | Ghosh et al. | |
| 2013/0304818 A1* | 11/2013 | Brumleve | H04L 67/02 |
| | | | 709/204 |
| 2014/0188993 A1* | 7/2014 | Klein | G06Q 10/063 |
| | | | 709/204 |
| 2015/0163630 A1* | 6/2015 | Hughes, Jr. | H04W 4/021 |
| | | | 455/456.3 |

FOREIGN PATENT DOCUMENTS

| | | |
|---|---|---|
| CN | 102594905 A | 7/2012 |
| CN | 103457975 A | 12/2013 |

OTHER PUBLICATIONS

International Preliminary Report on Patentability for corresponding PCT No. PCT/US2014/068684 dated Jan. 14, 2016, 9 pages.

"International Search Report & Written Opinion Received for PCT Patent Application No. PCT/US2014/068684", dated Apr. 24, 2015, 13 Pages.

Rodrigues, Filipe, "POI Mining and Generation", Jan. 1, 2010, Available at: http://eden.dei.uc.pt/~fmpr/msc_thesis.pdf.

"Teneo Social Media", Jan. 19, 2013 Available at: http://www.artificial-solutions.com/natural-language-interaction-products/teneo-social-media/.

Li, et al., "The Where in the Tweet", In Proceedings of the 20th ACM International Conference on Information and Knowledge Management, Oct. 24, 2011, 4 pages.

"Office Action Issued in European Patent Application No. 14824616.8", dated Dec. 12, 2017, 5 Pages.

"Office Action and Search Report Issued in Chinese Patent Application No. 201480071824.6", dated Nov. 14, 2018, 18 Pages.

* cited by examiner

Entry of POI in local index

| Name | Pizza Hut |
|---|---|
| Street | 2743 E Madison St |
| City | Seattle |
| Postcode | |
| State | |
| URL | |
| Geolocation | 47°36'35"N 122°19'59"W |
| Description | Pizza, Food |

POINT OF INTEREST TAGGING FROM SOCIAL FEEDS

BACKGROUND

Points of interest (POIs) like restaurants, cinemas, banks etc. represent a significant share of queries to a search engine. Search engines often have a local (search) index which is typically populated with local entities obtained from data service providers in different markets like Yellow Pages® and Nokia®. Nokia® collects information about local business in different countries and offers it under Nokia Prime Place®. Owners of points of interest typically want to have their business appear in responses to a user's query and also users would like to see as many relevant results as possible when searching for local businesses. Sometimes the business may turn up in the results even if the owner does not take any action since major search engines pull data from a lot of different sources. Some search engines allow owners of businesses to add information about their business directly to the local index which increases the likelihood of being found during a local search and increases the amount of information that is seen when the information is viewed. Some search engine providers sell upgrades and that help business owners to push above competitors.

Nevertheless, data found in the local index of search engines is not complete in the sense that it does not cover all the local entities in a certain market. Further, some of the attributes associated with each entity like phone number, URL, category, etc. may be missing. Local queries in a search engine have high probability of matching local entities stored in the local index when the query has the name or category of the entity while the entity exists in the index. However, a portion of local queries do not find enough matches in the index because of lack of tags associated with existing entities or the inexistence of the entities. This portion of queries that do not find the proper matches in the index results in LDCG loss in this case. DCG (Discounted Cumulative Gain) is a measure of effectiveness of a Web search engine algorithm or related applications, often used in information retrieval. Using a graded relevance scale of documents in a search engine result set, DCG measures the usefulness, or gain, of a document based on its position in the result list. The gain is accumulated from the top of the result list to the bottom with the gain of each result discounted at lower ranks. The more used form of DCG is NDCG, which is the normalized version of DCG. LDCG is the local version of DCG and it is used as the main metric in the field of search engines for measuring the quality of their local searches.

Hence, there is a need to enrich/complete entries of known entities with additional words, commonly called tags, such that the chances of finding an entity will be increased. These tags help in the local search process to enhance the matching of entities with queries. Thereby, the quality of search results is improved.

People tend to share their personal experiences in certain POIs over social networks. They put reviews of hotels and their favorite food in a restaurant, etc. Social feeds could be a good source to discover new entities that do not exist in the index or associate tags with existing entities.

The embodiments described below are not limited to implementations which solve any or all of the problems mentioned above.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In order to get faster more complete and more relevant search results for local searches, it is proposed to add search tags to an entry for a point of interest in a local index of a search index. Location-related social media messages, such as geo-tagged tweets or Facebook® or Foursquare® posts having location information associated with themselves, are obtained from within a neighborhood of the point of interest. Then, terms that are unique (specific, characteristic) to the point of interest are determined from the obtained messages. Subsequently, co-occurring terms for the unique terms are individually determined which are used as tags (also referred to as "keywords") to label the point of interest in the local index. Thereby, the point of interest is better characterized and can be better found in future searches.

It is also proposed to provide an enhanced user experience to the user entering a local query in a search engine by providing not only the search results but also social media messages associated thereto. A location-related search query is received from a user. Terms are extracted from the search query. The extracted terms are compared with tags of entities in the local index. A matching entity is retrieved together with social media messages that are relevant the entry. Thereby, a user does not only find objective information (name, address, etc.) about a point of interest, but also subjective opinions of other users who have already visited the point of interest. Hence, the user gets a more complete impression about the point of interest.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 illustrates an entry of a point of interest in a local index of a search index;

FIG. 4a illustrates a first way of presenting search results including the most relevant social media messages;

Like reference numerals are used to designate like parts in the accompanying drawings.

DETAILED DESCRIPTION

Figure 2:
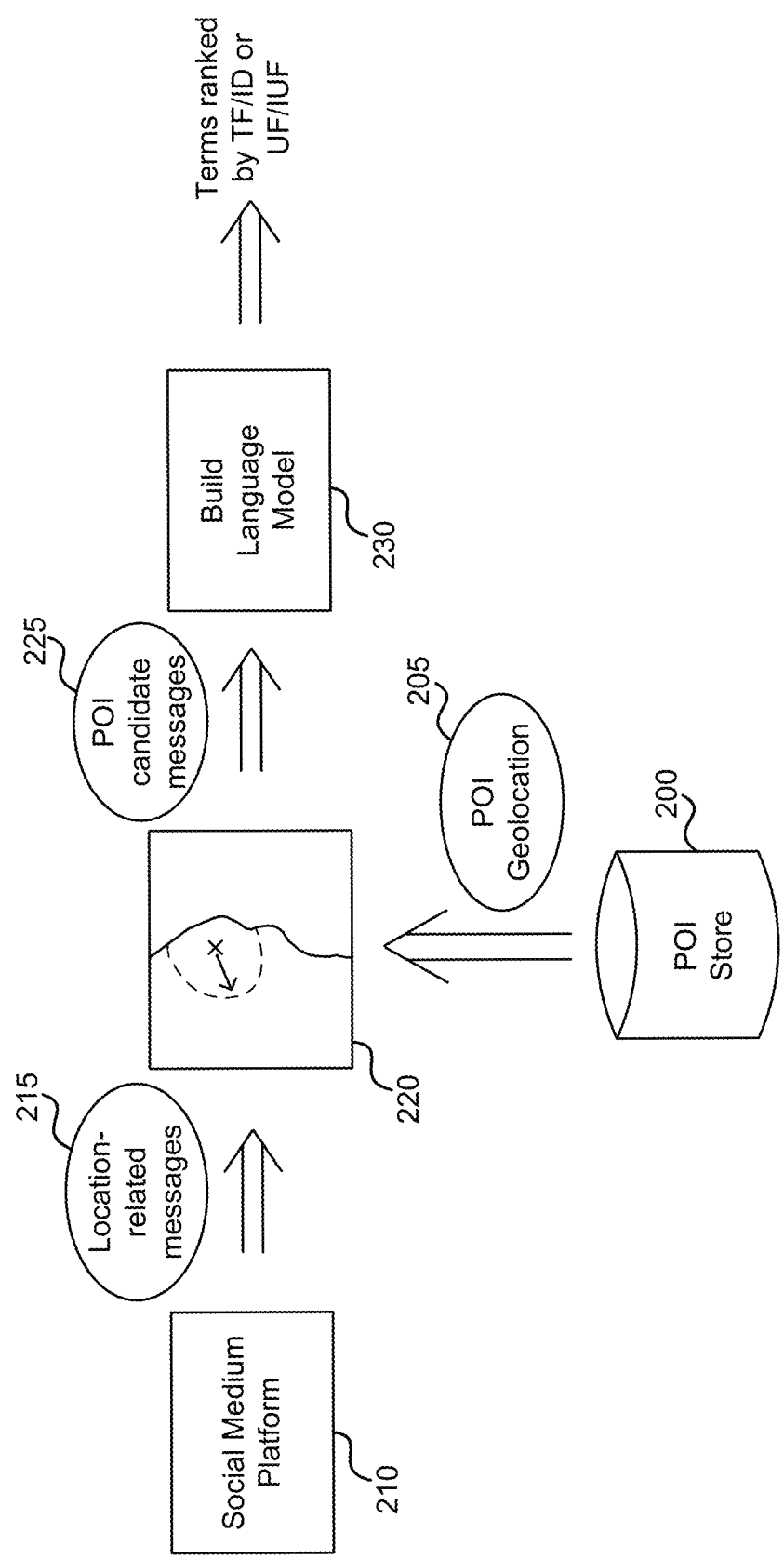
FIG. 2 illustrates how to determine unique terms from location-related social media messages.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system, the system described is provided as an example and not a limitation. As those skilled in the art will appreciate, the present examples are suitable for application in a variety of different types of computing systems.

FIG. 1 illustrates an entry of a point of interest in a local index of a search engine. Before proceeding further with the detailed description of FIG. 1, however, a few items of embodiments will be discussed.

A first aspect, which can be considered as the back-end, refers to a method of enriching an entry for an entity in a local index of a search engine with one or more tags. Location-related social media messages from within a neighborhood of the entity are obtained. One or more terms that are unique to the entity are determined from the obtained messages. Subsequently, one or more co-occurring terms are individually determined for the one or more unique terms. Then, the one or more co-occurring terms are used as one or more tags to label the entity in the local index.

In some of the embodiments, a social medium (platform) is Twitter®, while in other embodiments a social medium platform is Facebook® or Foursquare®. Generally speaking, all social medium platforms which allow geo-tagging may be used within the embodiments claimed.

Twitter® is an online social networking and microblogging service that enables users to send and read messages ("tweets"), which are text messages limited to 140 characters. Registered users can read and post tweets, but unregistered users can only read them. Users access Twitter® through the website interface, SMS, or mobile device app.

In some of the embodiments, location-related social media messages are geo-tagged tweets. Geo-tagging is the process of adding geographical identification metadata to various media such as a geo-tagged photograph or video, websites, SMS messages, QR Codes or RSS feeds and is a form of geospatial metadata. This data usually consists of latitude and longitude coordinates, though they can also include altitude, bearing, distance, accuracy data, and place names. The geographical location data used in geo-tagging will, in almost every case, be derived from the global positioning system (GPS), and based on a latitude/longitude-coordinate system that presents each location on the earth from 180° west through 180° east along the Equator and 90° north through 90° south along the prime meridian.

A Twitter® user may enable location services which allow him to selectively add location information to his Tweets. This feature is off by default and he will need to opt-in to use it. Once location services are enabled through either web setting or mobile device, Twitter® will be able to attach the specific coordinates (latitude and longitude) of the location where a tweet was posted.

In other embodiments, location-related social messages are geo-tagged Facebook® messages. Facebook® is an online social networking service. Users register before using the site, after which they may create a personal profile, add other users as friends, exchange messages, and receive automatic notifications when they update their profile.

In still other embodiments, the social medium is Foursquare®. Foursquare® is a location-based social networking website for mobile devices, such as smartphones. Users "check-in" at venues using a mobile website, text messaging or a device-specific application by selecting from a list of venues the application locates nearby. The location is determined by GPS hardware in the mobile device or network location provided by the application. Each check-in awards the user points and sometimes "badges". The user who checks in the most often to a venue becomes the "mayor", and users regularly vie for "mayorships".

Generally speaking, a location-related social media message is a message from a social media platform which carries an indication of the location where it was sent.

In some of the embodiments, an entity is a point of interest (POI) that in turn is a specific point location that someone may find useful or interesting. In some of the embodiments, a point of interest is a business such as a shop, a shopping center, a restaurant, a bank, a hotel, a campsite, a fuel station, an amusement park or a touristic sight.

In some of the embodiments, an (incomplete) entry of an entity in a local index is known as well as the location of the entity. Then, a social media database is accessed which contains location-related messages. In the case of Twitter®, the so-called Firehose® service, if available to the programmer, can be used which provides a stream of currently posted (public) tweets. If the Firehose Service® is not available, the public option is to access Twitter® through Twitter® APIs. In some of the embodiments, the social media messages are obtained from the database in a real-time fashion. All location-related messages within a neighborhood of the entity are then obtained. Then, unique terms are calculated from the obtained messages. In some of the embodiments, the unique terms are calculated by removing stop words from the messages.

In computing, stop words are typically short, frequently occurring, unspecific words which are filtered out prior to, or after, processing of natural language data (text). There is not one definite list of stop words which all tools use and such a filter is not always used. Any group of words can be chosen as the stop words for a given purpose. For some search machines, these are some of the most common, short function words, such as the, is, at, which, and on. The remaining terms are ranked according to a score which reflects the importance (or relevance) of the term within the neighborhood of the entity.

In some of the embodiments, the score is based on a user-frequency-inverse user frequency metric (UF-IUF) which divides the number of users who mentioned the term in their location-related social media messages by the total number of users who sent location-related social media messages within the neighborhood of the entity. A term gets for example a high score if it is mentioned by relatively many users compared to the overall number of users who sent local-related social media messages in the neighborhood of the entity. The expression "is based on" as used above means that variations of this metric exist which can also be applied in embodiments, as the skilled person will readily recognize.

In other embodiments, the score is based on a term-frequency-inverse document frequency metric (TF-IDF) which is a numerical statistic that reflects how important a word is to a document in a collection or corpus. It is often used as a weighting factor in information retrieval and text mining. The TF-IDF score value increases proportionally to the number of times a word occurs in the document, but is offset by the frequency of the word in the corpus, which helps to control for the fact that some words are generally more common than others.

For the present embodiments, this means that the "documents" are the social media messages and the "collection" or "corpus" are all social media messages within the neighborhood of the entity. Hence, the term frequency-inverse document frequency is the number of times a term has occurred in all location-related social media messages divided by the number of location-related social media messages within the neighborhood of the entity in which the term has occurred. In other words, a term gets for example a high score when it occurs many times but only in few location-related social media messages within the neighborhood of the entity. Again, many variations of the TF-IDF metric are known and may be used by the skilled person to implement embodiments.

A "term" is considered to be a "unique term" to an entity, if its score is above a threshold. (Of course, under the doctrine of equivalence the definition of the score can be mathematically re-defined such that the score of a term is then below a threshold to be a unique term.)

In some of the embodiments, the term score is aggregated over multiple entities to rank the terms. Thereby, a language model for a whole region (=the terms that are unique to a whole region) comprising several entities is obtained which promotes terms that are unique to certain entities over more common terms that occur in multiple entities. Empirically, it has been found out that the names of entities are obtained as the top score terms. This is the case because location-related social media messages are selected around the POI location and most of these messages are check-in social media messages generated by social networks like Foursquare®.

In some of the embodiments, unique terms to each entity are obtained by filtering the location-related social media messages with some unique attributes to the entity like URL, name, or parts of its description in the local index of the search engine. Subsequently, in some of the embodiments, the most frequent co-occurring terms are calculated for the promoted top score terms from above. The most frequent co-occurring terms serve as meta-data tags to label the entity with. By enriching an entry for an entity in a local index of a search engine with (additional) search tags, the entity can be better found. A "tag" is a keyword or term assigned to a piece of information. This kind of metadata helps describe an item and allows it to be found again by browsing or searching.

In some of the embodiments, the co-occurring terms are individually determined for the unique terms from location-related social media messages and non-location-related social media messages. In other words, for each unique term of the entity, one or more co-occurring terms are determined by ranking (some or all of) the terms that are also within social media messages containing the unique term according to a score that reflects the importance (or relevance, meaningfulness) of the terms within the (location-related and non-location related) social media messages. In some of the embodiments, the score is based on a term frequency-inverse document frequency (TF-IDF) metric or a user frequency-inverse user frequency (UF-IUF) metric and those terms having a score value higher than a threshold are added as tags in the entry of the entity. In some of the embodiments, not only the co-occurring terms are added as tags in the entry of the entity, but also the unique terms that have been determined for the entity are added to the entry of the entity in the local index. However, the co-occurring terms are typically richer (more meaningful) than the unique terms.

In some of the embodiments, the co-occurring terms are determined from social media messages posted within a period of time. In some of the embodiments, the period of time is three months, in other embodiments, the period of time is six months, in other embodiments the period of time is one year and in still other embodiments, the period of time is two years. In some of the embodiments, the entity in the local index is associated with location-related social media messages pertaining to the entity In some of the embodiments, the neighborhood comprises an area of a circle around the entity with a radius of 100 m to 200 m. In other embodiments, the neighborhood comprises an area of a circle around the entity with a radius of 500 m. In still other embodiments, the neighborhood has the form of a square or any other geometric form.

Another aspect refers to a computing device that has a processing unit; and a computer storage medium comprising computer-executable instructions stored thereon which, when executed by the processing unit cause the processing unit to perform a method of enriching an entry for an entity in a local index of a search engine with one or more tags. The method includes obtaining location-related social media messages from a neighborhood of an entity. Then, one or more terms that are unique to the entity are determined from the obtained messages by means of a score that is based on a user-frequency-inverse user frequency metric which comprises the number of users who mentioned the term in their location-related social media messages within the neighborhood of the entity divided by the total number of users who sent location-related social media messages within the neighborhood of the entity. Then, one or more co-occurring terms are determined for the one or more unique terms; and the one or more co-occurring terms are used to label the entity in the local index.

A third aspect, which can be considered as a front end, refers to one or more computer storage media comprising computer executable instructions stored thereon which, when executed by a processor, cause the processor to perform a method of providing search results from a local index of a search engine to a user. The method includes receiving a location-related search query from a user. Then (search) terms are extracted from the search query, for example by removing stop words from the search query. The extracted terms are compared with tags of entities in the local index. Then, a matching entity is retrieved from the local index together with social media messages associated with the entity.

In some of the embodiments, the entity is a point of interest.

In some of the embodiments, the social media messages associated with the entity are the social media messages that characterize the entity or are relevant with regard to the entity.

In some of the embodiments, multimedia items associated with the matching entities are returned to the user.

In some of the embodiments, the social media messages associated with the entity are displayed in a ranking based on the number of tags of the entity that are also found in a particular social media message.

In some of the embodiments, the social media messages associated with the entity are displayed in ranking based on the freshness of the social media messages. While the fresher social media messages are placed on top, the older social media messages are placed below.

In some of the embodiments, the multimedia items are images or videos people have taken in the entity.

Finally, another aspect refers to a method of discovering a new entity and adding it to a local index of a search engine. The method includes obtaining location-related social media messages in a neighborhood of a known entity. Then, one or more unique terms are determined from the obtained messages. A name of an entity is derived from the unique terms. Then, it is searched in the local index whether the entity is already present (has already an entry). If the entity is not found in the local index, a new entry is added for the entity in the local index.

In some of these embodiments, a name of an entity is derived by determining unique words and ranking them based on UF-IUF metric or TF-IDF metric so that names of entities appear on top of the ranking.

While individual features of embodiments have been explained separately above, it is clear that the features can be combined within one embodiment.

Returning now to FIG. 1, which shows an example of an entry 100 for a point of interest in a local index of a search engine. The point of interest in this example is a particular Pizza Hut® restaurant in Seattle. As can be seen, the entry 100 has several attributes like "name", "street", "city" and the "geo-location", etc. but is incomplete since the attributes "postcode", "state" and "URL" are missing. The attribute "description" (keywords) only includes the tags "Pizza" and "Food". If someone wanted to search a restaurant in Seattle where he could eat pasta, this particular Pizza Hut® restaurant would not be found, although it actually offers pasta in reality. Therefore, the entry of this entity will be enriched with additional search tags to improve the quality of the search results so that in future a user searching for a place where she could eat pasta will find this particular restaurant among the search results.

FIG. 2 illustrates how to find terms that are unique to points of interest within a region. A POI store 200 contains the geographic location of many points of interest, while a social media platform 300 provides location-related social media messages. If the social medium platform 300 is Twitter®, then the location-related social media messages 215 are geo-tagged tweets. After the POI store 200 has delivered a geo-location 205 of a point of interest, then all location-related social media messages sent within a neighborhood of the point of interest (=POI candidate messages 225), for example within a radius of 500 m (see map 220), are taken into account to build a language model 230. To this end, all stop words are removed from all POI candidate messages 225. Then, the remaining terms are ranked according to a score which is based on a user frequency-inverse user frequency (UF-IUF) metric (or a term frequency-inverse document frequency (TF-IDF)). To determine the score of a term, the number of users within the neighborhood of the point of interest that mentioned the term in their messages is divided by the number of users that posted a message within the neighborhood of the point of interest. Those terms whose score is above a threshold are considered to be unique terms to the POI. As already mentioned above, when the unique terms are ranked according to the metrics described above, the entity names are ranked on top.

Figure 3:
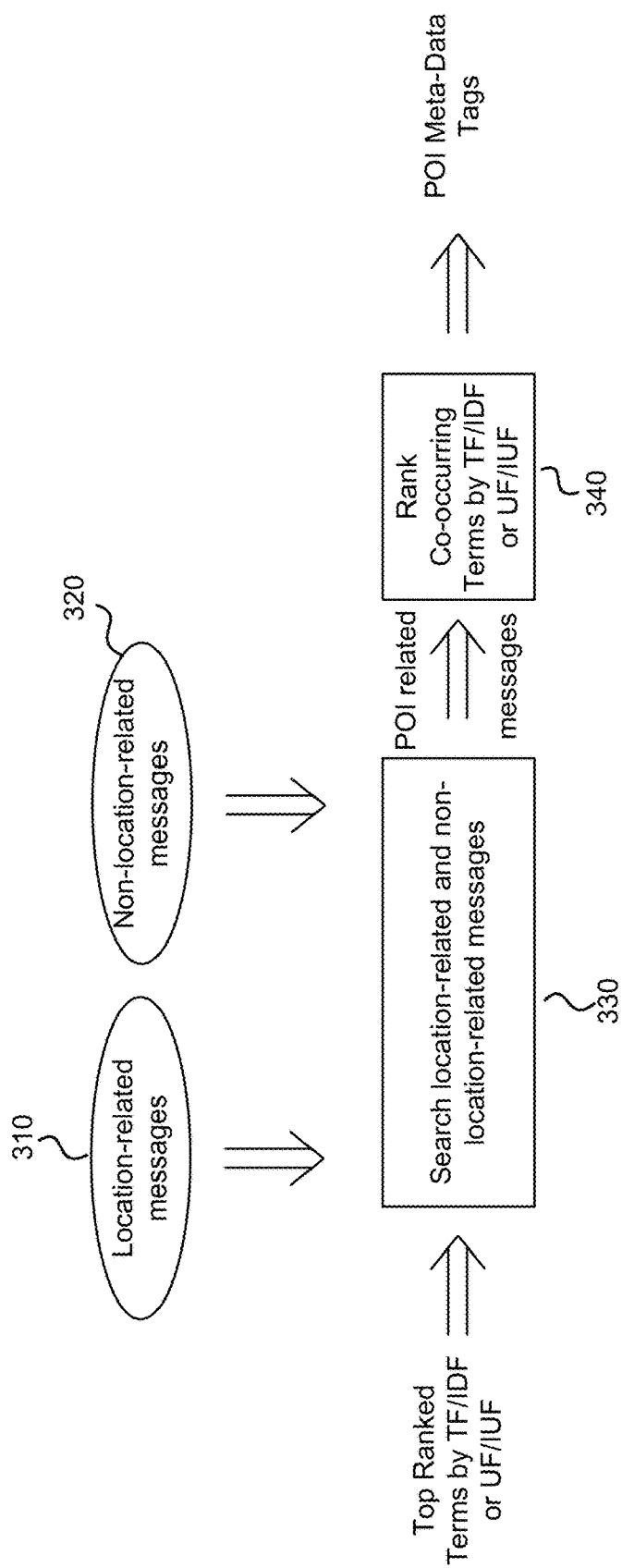
FIG. 3 illustrates how to obtain co-occurring terms for the unique terms.

FIG. 3 shows how POI metadata tags are derived in a next phase from the unique terms. In this phase, the unique terms (=terms that have a high score based on UF-IUF (or TF-IDF)) are used and it is determined for each of these unique terms which other terms are frequently used in social media messages that contain the unique term. For example, if there are many social media messages like "I ate delicious pasta at Pizza Hut", then the terms "pasta" and "Pizza Hut" are considered to be co-occurring terms. In this phase, a broader basis of social media messages is analysed. Not only location-related social media messages 310 are taken into account, but also non-location-related social media messages 320. Thereby, more co-occurring terms may be found since a greater corpus is used as a basis. At 330, for each unique term, all location-related and non-location-related social messages 310, 320 containing the unique term are determined and are referred to as "POI related messages". The POI related messages are further temporally limited to be social media messages from a period of time, for example, the last six weeks. Some or all terms in the POI related messages (except the unique term) are ranked by a TF-IDF or UF-IUF (number of unique users mentioning a co-occurring term divided by the total number of unique users using the unique term itself) metric which means that the co-occurring terms that are unique and frequent will rank higher. Those terms having a score higher than a threshold will be added as POI metadata tags under the attribute "description" in the entry 100 of the entity, if that term is not yet stored under "description".

Figure 4A:
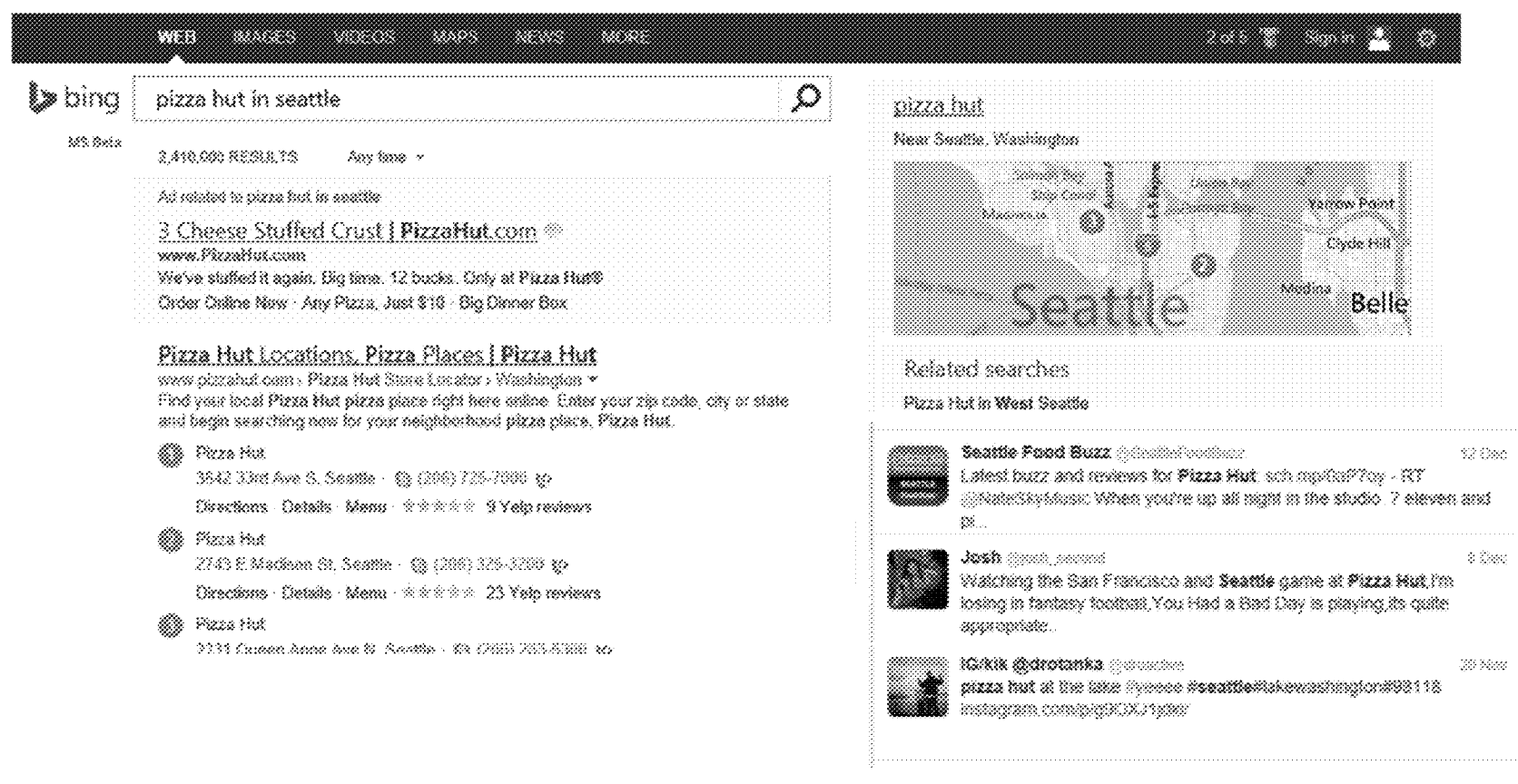
Figure 4B:
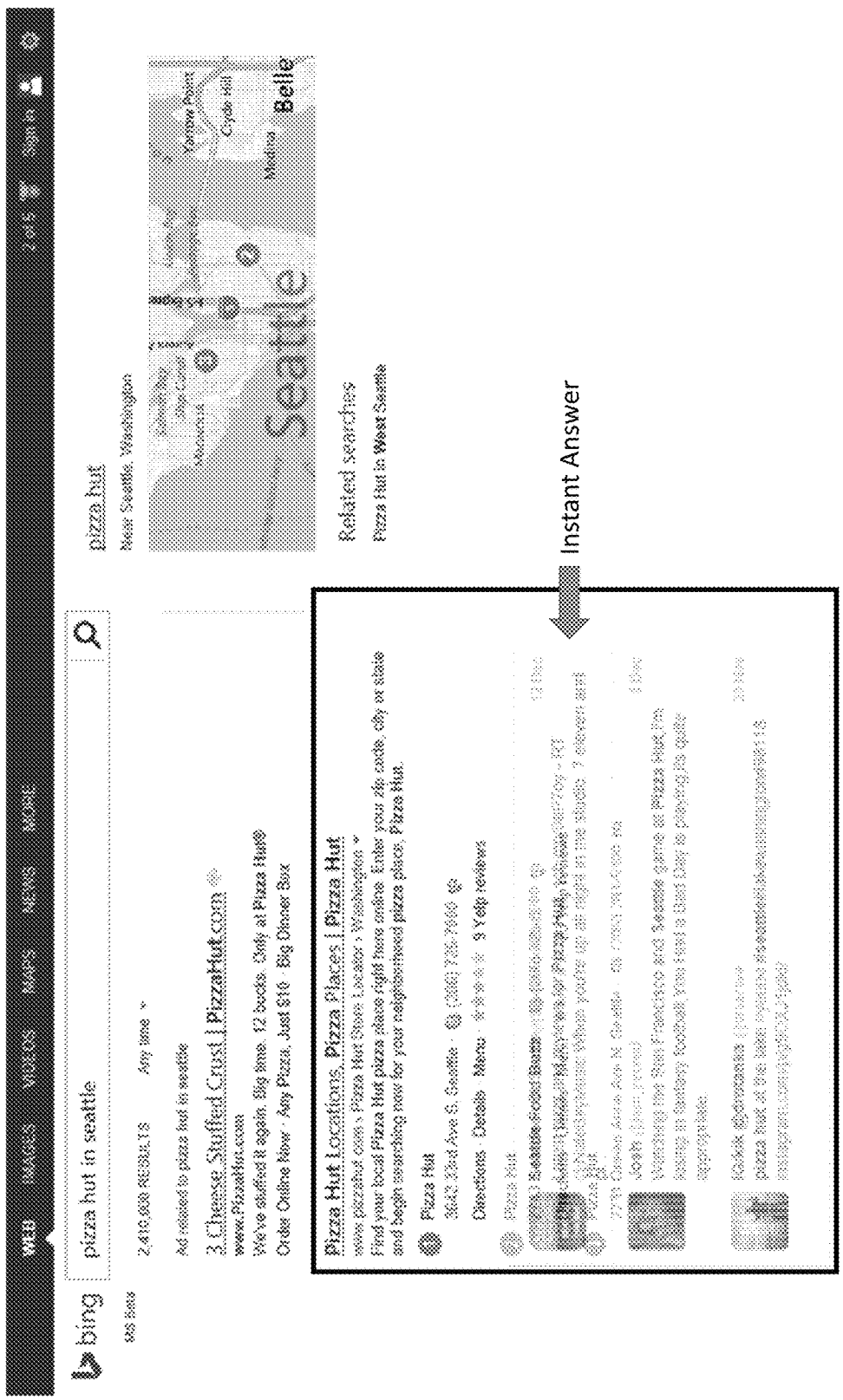
FIG. 4b illustrates a second way of presenting search results including the most relevant social media messages.

FIGS. 4a and 4b illustrate the front-end of embodiments and refer to the enhanced experience the user has when searching for local businesses. Social media messages are displayed in a ranking based on (a) the number of POI metadata tags of the entity are also found in a particular social media message or (b) based on the freshness of the social media messages or (c) based on the length of the social media messages or (d) based on the length of the social media messages or (e) based on whether the author has a verified account (author authority) or (f) based on the number of times the social media message has been re-posted or (g) based on the number of replies to this social media message. The ranked social media messages are displayed along with the results of the query. The social media message relevant to a point of interest shows the feedback of people on that point of interest or what people say in general about their experience with this point of interest. The geo-location information of the point of interest can be used to obtain relevant images and videos people have taken in this point of interest. Augmenting the user experience with other users' experience in points of interest sets the expectations of the user visiting the point of interest and helps her make better decisions when comparing multiple points of interest.

FIG. 4a shows the relevant social media messages in the right half of the display which typically shows complementary material to the search results like recommended queries. In FIG. 4b, the social media messages are displayed in the left half of the page which shows the results of the search. The social media messages are displayed in an instant answer.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units.

Figure 5:
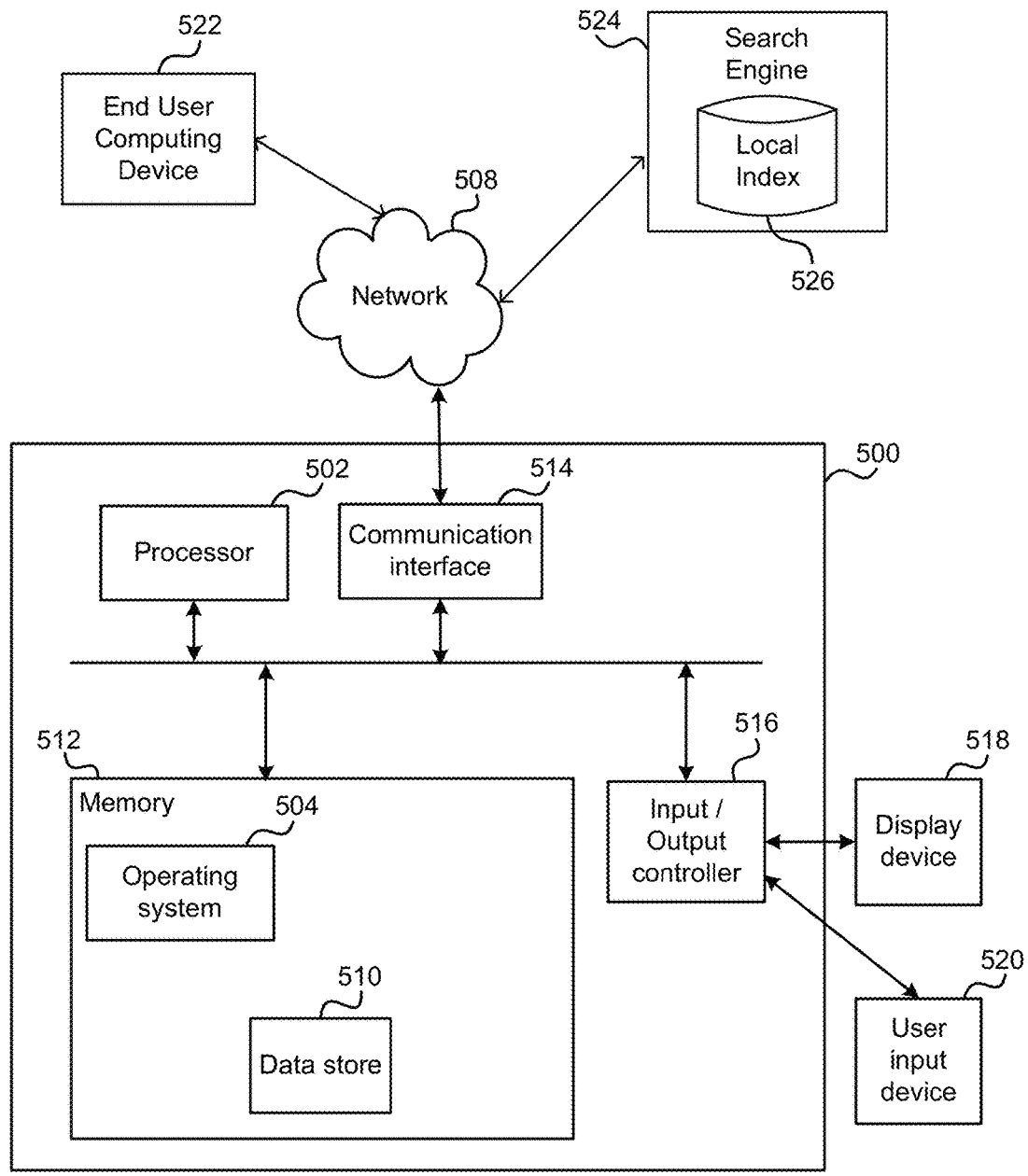
FIG. 5 illustrates a computing environment on which embodiments of methods presented herein may be implemented.

FIG. 5 illustrates various components of an exemplary computing-based device 500 which may be implemented as any form of a computing and/or electronic device, and in which embodiments of a method of enriching an entry in a local index of a search engine may be implemented.

The computing-based device 500 is also capable of performing a method of adding a new entry of an entity to the local index 526 of a search engine and of providing search results including relevant social media messages to an end user at an end user computing device 522. The computing-based device 500 comprises one or more processors 502 which may be microprocessors, controllers or any other suitable type of processors for processing computer executable instructions to control the operation of the device 500.

In some examples, for example where a system on a chip architecture is used, the processors 502 may include one or more fixed function blocks (also referred to as accelerators) which implement a part of the download method in hardware (rather than software or firmware). Platform software comprising an operating system 504 or any other suitable platform software may be provided at the computing-based device 500. A data store 510 is provided which may obtain social media messages for processing and analyzing their content. The computing-based device 500, the end user computing device 522 and the search engine 524 are connected with each other via a network 508.

The computer executable instructions may be provided using any computer storage media that is accessible by the computing-based device 500. Computer storage media, such as memory 512, includes volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium is not to be interpreted to be a propagating signal per se. Propagated signals may be present in a computer storage media, but propagated signals per se are not examples of computer storage media.

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse, keyboard, camera, microphone or other sensor). Displays and keyboards may be connected through switches. In some examples the user input device 520 may detect voice input, user gestures or other user actions and may provide a natural user interface (NUI). This user input may be used to control the download method, to set parameter values, to view results and for other purposes. In an embodiment the display device 518 may also act as the user input device 520 if it is a touch sensitive display device. The input/output controller 516 may also output data to devices other than the display device, e.g. a locally connected printing device.

The input/output controller 516, display device 518 and optionally the user input device 520 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer storage medium. Examples of tangible storage media include computer storage devices comprising computer storage media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   obtaining location-related social media messages posted from a plurality of users from within a neighborhood of an entity eligible for inclusion as an entry in a local index of a search engine, wherein the neighborhood comprises an area around the entity with a predetermined range;
   determining, from the obtained messages, one or more terms that are unique to the entity after filtering the obtained messages with one or more attributes that are unique to the entity in the local index of the search engine;
   individually determining one or more co-occurring terms within the one or more unique terms, wherein the one or more co-occurring terms are identified as being co-occurring based on a frequency of use in a social media network, wherein the frequency of use is based on use of the terms in the location-related social media messages having associated geo-location information that indicates posting within the neighborhood in addition to use of the terms in social media messages having an absence of associated geo-location information;
   enriching the entry for the entity using the one or more co-occurring terms as one or more search tags to label the entity in the local index of the search engine, wherein the one or more search tags are used to label the entity and one or more other entities in the local index of the search engine;
   receiving a location-related search query, the location-related search query including a first and a second portion of text, wherein the first portion of text provides one or more search terms associated with the one or more search tags and wherein the second portion of text provides one or more location terms associated with the area around the entity;
   performing a search of the local index using the search engine, the search of the local index being performed using the one or more search tags and the one or more location terms, wherein the search identifies the area around the entity based on the one or more location terms, and wherein the search identifies the one or more co-occurring terms relevant to the entity based on the one or more search tags;
   retrieving search results associated with the entity from the search of the local index; and
   outputting the search results associated with the entity for display on a user interface.

2. The method of claim 1, wherein the entity comprises a point of interest.

3. The method of claim 1, wherein the location-related social media messages are obtained in a real-time fashion from a database of a social medium platform.

4. The method of claim 1, wherein determining the one or more unique terms comprises removing stop words from the location-related social media messages and ranking remaining terms according to a score which reflects importance of a corresponding term of the remaining terms within the neighborhood of the entity.

5. The method of claim 4, wherein the score is based on a user frequency-inverse user frequency metric which comprises a number of users who mentioned the corresponding term in respective location-related social media messages within the neighborhood of the entity divided by a total number of users who sent the location-related social media messages within the neighborhood of the entity.

6. The method of claim 4, wherein the score is based on a term frequency-inverse document frequency metric which comprises a number of times the corresponding term has occurred in the location-related social media messages within the neighborhood of the entity divided by a number of location-related social media messages within the neighborhood of the entity in which the corresponding term has occurred.

7. The method of claim 4, wherein the score of the corresponding term is aggregated over multiple entities to rank the corresponding term.

8. The method of claim 1, wherein individually determining one or more co-occurring terms within the one or more unique terms comprises ranking terms that are within the location-related social media messages and non-location-related social media messages containing a unique term of the one or more unique terms according to a score that reflects importance of a respective term of the ranked terms within the location-related social media messages and the non-location-related social media messages.

9. The method of claim 8, wherein the score is based on a term frequency-inverse document frequency metric or a user frequency-inverse user frequency metric.

10. The method of claim 1, wherein the co-occurring terms are determined from one or more social media messages that are posted within a period of time.

11. The method of claim 1, further comprising associating the entity in the local index with one or more location-related social media messages pertaining to the entity.

12. The method of claim 1, wherein the neighborhood comprises an area of a circle around the entity with a predetermined radius range.

13. A computing device comprising: a computing processor; and a computer storage medium comprising computer-executable instructions stored thereon which, when executed by the computing processor cause the computing processor to perform electronic operations comprising: obtaining location-related social media messages posted from a plurality of users from a neighborhood of an entity, wherein the neighborhood comprises an area around the entity with a predetermined range; determining, from the obtained messages, one or more terms that are unique to the entity after filtering the obtained messages with one or more attributes that are unique to the entity in a local index of a search engine; individually determining one or more co-occurring terms within the one or more unique terms, wherein the one or more co-occurring terms are identified as being co-occurring based on a frequency of use in a social media network, wherein the frequency of use is based on use of the terms in the location-related social media messages having associated geo-location information that indicates posting within the neighborhood in addition to use of the terms in social media messages having an absence of associated geo-location information; enriching an entry for the entity in the local index using the one or more co-occurring terms as one or more search tags to label the entity in the local index, wherein the one or more search tags are used to label the entity and one or more other entities in the local index of the search engine; receiving a location-related search query, the location-related search query including a first and a second portion of text, wherein the first portion of text provides one or more search terms associated with the one or more search tags and wherein the second portion of text provides one or more location terms associated with the area around the entity; performing a search of the local index using the search engine, the search of the local index being performed using the one or more search tags and the one or more location terms, wherein the search identifies the area around the entity based on the one or more location terms, and wherein the search identifies the one or more co-occurring terms relevant to the entity based on the one or more search tags; retrieving search results associated with the entity from the search of the local index; and outputting the search results associated with the entity for display on a user interface.

14. One or more non-transitory computer storage media comprising computer-executable instructions stored thereon which, when executed by a processor, cause the processor to perform a method comprising:
obtaining location-related social media messages posted from a plurality of users from within a neighborhood of an entity eligible for inclusion as an entry in a local index of a search engine, wherein the neighborhood comprises an area around the entity with a predetermined range;
determining, from the obtained messages, one or more terms that are unique to the entity after filtering the obtained messages with one or more attributes that are unique to the entity in the local index of the search engine;
individually determining one or more co-occurring terms within the one or more unique terms, wherein the one or more co-occurring terms are identified as being co-occurring based on a frequency of use in a social media network, wherein the frequency of use is based on use of the terms in the location-related social media messages having associated geo-location information that indicates posting within the neighborhood in addition to use of the terms in social media messages having an absence of associated geo-location information;
enriching the entry for the entity using the one or more co-occurring terms as one or more search tags to label the entity in the local index of the search engine, wherein the one or more search tags are used to label the entity and one or more other entities in the local index of the search engine;
receiving a location-related search query from a user device, the location-related search query including a first and a second portion of text, wherein the first portion of text provides one or more search terms associated with the one or more search tags and wherein the second portion of text provides one or more location terms associated with the area around the entity;
extracting search terms from the location-related search query;
performing a search of the local index using the search engine, the search of the local index being performed using the one or more search tags of the entity and the one or more location terms, and comparing the extracted search terms with search tags of respective entities in the local index, wherein the search identifies the area around the entity based on the one or more location terms, and wherein the search identifies the one or more co-occurring terms relevant to the entity based on the one or more search tags;
retrieving search results from the search of the local index, the search results comprising a matching entity together with the location-related social media messages associated with the matching entity; and
providing the search results to the user device for displaying the location-related social media messages in a ranking based at least in part on one or more of whether respective authors of the location-related social media messages have verified accounts, or respective numbers of points of interest (POI) metadata tags of the matching entity that are found in the location-related social media messages; and
outputting the search results for display on a user interface of the user device according to the ranking.

15. The one or more non-transitory computer storage media of claim 14, wherein providing the search results further includes displaying the location-related social media messages among the retrieved matching entity or beside the matching entity.

16. The one or more non-transitory computer storage media of claim 14, wherein the search results include multimedia items associated with the matching entity.

17. The one or more non-transitory computer storage media of claim 14, wherein the ranking is further based on respective numbers of tags of the matching entity that are found in the location-related social media messages.

18. The one or more non-transitory computer storage media of claim 14, wherein the ranking is further based on respective freshness of the location-related social media messages.

19. The one or more non-transitory computer storage media of claim 16, wherein the multimedia items are images or videos people have taken at a location of the matching entity.

* * * * *